UNITED STATES PATENT OFFICE.

GEORGE T. LEWIS, OF PHILADELPHIA, PENNSYLVANIA.

IMPROVEMENT IN MANUFACTURE OF ALUM-CAKE AND SULPHATE OF ALUMINA.

Specification forming part of Letters Patent No. 209,488, dated October 29, 1878; application filed July 20, 1878.

*To all whom it may concern:*

Be it known that I, GEORGE T. LEWIS, of Philadelphia, Pennsylvania, have invented a new and improved process of decomposing clay and other aluminous silicates that are decomposable by sulphuric acid for the more economical manufacture of aluminous cake, sulphate of alumina, and alum; and I hereby declare the following to be a full, clear, and exact description of the process.

The aluminous material, either raw or roasted, or in a state of raw and roasted materials mixed, is subjected to friction and pressure by being ground under, between, or by ordinary horizontal or vertical burr-stones, or other apparatus producing like effects. At the same time that the aluminous material is being fed into the mill it is subjected to the action of sulphuric acid, either hot or cold, (though preferably hot,) which is run in at the eye of the stone or through an aperture in the stationary stone at a point between the eye and the periphery of the stone, the aluminous material and the acid being thus thoroughly mixed.

I use for one hundred pounds of aluminous material two and one-third pounds of anhydrous sulphuric acid for each per cent. of alumina present in the raw material; or, if the aluminous material contains forty per cent. of alumina and the acid fifty per cent. of anhydrous sulphuric acid, I use about one hundred and eighty pounds of acid to each one hundred pounds of the aluminous material. Acid of 45° to 50° Baumé gives the best result, although acid of a different strength may be used if more convenient. The mixture resulting from the above operations is now heated, in any convenient way, to 180° and 212° Fahrenheit, (or, when neutral or slightly basic alum is required, the mixture is heated to 240° Fahrenheit and 260° Fahrenheit,) and kept so heated for a few days, if necessary, which is the case if ordinary clay or kaolin is used, and the resulting mixture, containing silica and sulphate of alumina, is either treated with water to dissolve the sulphate of alumina, and the solution leached and converted into any of the forms of sulphate of alumina or alum by ordinary processes, or the mixture of silica and sulphate of alumina is reduced to a powder in any convenient manner, (a Bogardus eccentric mill answers for this purpose,) and is then ready for the market.

I claim—

The process which consists of grinding aluminous materials and mixing them with sulphuric acid in one operation, and afterward heating the resulting mixture to 180° and 260° Fahrenheit, for the manufacture of aluminous cake and alum, substantially as set forth.

GEORGE T. LEWIS.

Witnesses:
W. F. KIRCHER,
H. R. SHULTZ.

Correction in Letters Patent No. 209,488.

It is hereby certified that in the original specification and claim on file in the Patent Office, the arbitrary sign "@" occurs instead of the word "and" between the figures expressing degrees of temperature as found in column 2, lines 6, 9, and 26 (the latter being line 4 of the claim) of the printed specification herein contained.

December 13, 1878.